(12) United States Patent
Walter et al.

(10) Patent No.: US 7,496,458 B2
(45) Date of Patent: Feb. 24, 2009

(54) ELECTRICAL TRANSDUCER

(75) Inventors: Heinz Walter, Hergatz (DE); Alfred Wagner, Bodnegg (DE)

(73) Assignee: i f m electronic GmbH, Essen (DE)

( * ) Notice: Subject to any disclaimer, the term of this patent is extended or adjusted under 35 U.S.C. 154(b) by 98 days.

(21) Appl. No.: 10/051,297

(22) Filed: Jan. 22, 2002

(65) Prior Publication Data

US 2002/0145528 A1    Oct. 10, 2002

(30) Foreign Application Priority Data

Jan. 22, 2001    (DE)    ................................ 101 02 791

(51) Int. Cl.
*G06F 19/00* (2006.01)
(52) U.S. Cl. .......................... 702/57; 702/85; 702/104; 702/138; 73/1.59
(58) Field of Classification Search ................... 702/57, 702/64, 65, 85, 86, 87, 88, 98, 104, 116, 702/138, 139, 140, 50; 73/1.59, 1.61, 1.62, 73/1.63, 1.64
See application file for complete search history.

(56) References Cited

U.S. PATENT DOCUMENTS

| | | | | |
|---|---|---|---|---|
| 3,805,092 A | * | 4/1974 | Henson | ....................... 327/356 |
| 3,948,098 A | * | 4/1976 | Richardson et al. | ....... 73/861.24 |
| 4,524,624 A | * | 6/1985 | Di Noia et al. | ................ 73/708 |
| 5,047,914 A | * | 9/1991 | Dhyanchand et al. | .......... 363/98 |
| 5,083,091 A | * | 1/1992 | Frick et al. | ................... 324/678 |
| 5,207,101 A | * | 5/1993 | Haynes | ......................... 73/597 |
| 5,252,967 A | * | 10/1993 | Brennan et al. | ......... 340/870.02 |
| 5,254,992 A | * | 10/1993 | Keen et al. | ................... 341/119 |

(Continued)

FOREIGN PATENT DOCUMENTS

DE    1 640 922    9/1971

(Continued)

OTHER PUBLICATIONS

TRAC Application Note, "Single Quadrant and Four Quadrant Multiplier Utilising TRAC", TRAC Application Note AN5, Issue 1, Sep. 1998.*

(Continued)

*Primary Examiner*—Jeffrey R West
(74) *Attorney, Agent, or Firm*—David S. Safran; Roberts Mlotkowski Safran & Cole, P.C.

(57) ABSTRACT

An electrical transducer has a sensor outputting a value corresponding to the quantity to be measured, an analog end stage connected downstream of the sensor, a processor circuit, and an analog measurement signal transmission path. The end stage converts the sensor output signal into an impressed output current related to the magnitude of the quantity measured, the electronic transducer being controlled with the processor circuit. The electrical transducer can be scaled by the user, has low inherent power consumption and ensures high response speed because the processor circuit in normal operation is shifted temporarily into a sleep mode, in the analog measurement signal transmission path an analog scaling unit is inserted, the output signal of the sensor and at least one analog setting value are supplied to the analog scaling unit, and the output signal of the analog scaling unit is supplied to the analog end stage.

17 Claims, 9 Drawing Sheets

U.S. PATENT DOCUMENTS

| | | | |
|---|---|---|---|
| 5,416,723 A * | 5/1995 | Zyl | 713/300 |
| 5,420,379 A * | 5/1995 | Zank et al. | 178/19.03 |
| 5,477,735 A * | 12/1995 | Li | 73/654 |
| 5,488,307 A | 1/1996 | Plott | 324/555 |
| 5,714,903 A * | 2/1998 | Bruccoleri et al. | 327/359 |
| 5,866,565 A * | 2/1999 | Shutske et al. | 514/217.05 |
| 5,886,565 A * | 3/1999 | Yasui et al. | 327/530 |
| 5,956,663 A * | 9/1999 | Eryurek | 702/183 |
| 6,057,794 A * | 5/2000 | Takamuki | 341/143 |
| 6,388,617 B1 * | 5/2002 | Flood et al. | 342/386 |
| 6,480,131 B1 * | 11/2002 | Roper et al. | 341/155 |
| 6,512,358 B2 * | 1/2003 | Klofer et al. | 324/103 P |
| 6,571,111 B1 * | 5/2003 | Mayo et al. | 455/574 |

FOREIGN PATENT DOCUMENTS

| | | |
|---|---|---|
| DE | 40 16 922 | 11/1991 |
| DE | 4016922 * | 11/1991 |
| DE | 4016922 A * | 11/1991 |
| DE | 4016922 A1 * | 11/1991 |
| DE | 4016922 C3 * | 11/1991 |
| DE | 199 22 060 A1 | 11/1999 |
| EP | 0 219 120 | 4/1987 |
| JP | 04359399 A * | 12/1992 |
| WO | WO88/01417 | 2/1988 |
| WO | WO 88/01417 A1 * | 2/1998 |
| WO | WO 99/60340 A2 * | 11/1999 |

OTHER PUBLICATIONS

Wilson et al., Universal Sensor Interface Chip (USIC): Specification and Applications outline, pp. 18-21, 1996, Sensor Review, vol. 16, No. 1.

* cited by examiner

ELECTRICAL TRANSDUCER

BACKGROUND OF THE INVENTION

1. Field of the Invention

The invention relates to an electrical transducer using a two-wire process, with a quality measurement sensor. An analog end stage is connected downstream of the sensor, the sensor and the analog end stage being connected to one another via an analog measurement signal transmission path, and in cooperation with a with a processor circuit, the end stage converts the output signal of the sensor into an impressed output current with a magnitude which is a measurement of the quantity to be measured. The electronic transducer can also be controlled with a processor circuit. In addition, the invention relates to a process for indicating a the measured value with an output current which is proportional to the measured value. The measurement is performed with an electrical transducer, the transducer having a sensor, an analog end stage which is connected downstream of the sensor, and a processor circuit, the analog end stage converting the output signal of the sensor into an impressed output current with a level which is a measure of the quantity to be measured, the electrical transducer capable of being controlled using the processor circuit.

2. Description of Related Art

Electrical transducers using the two-wire process are known, for example, as pressure transmitters. The sensor which has been integrated into the transducer generally has, besides the actual sensor element, a signal conditioning unit. The sensor element can be designed both for contact measurement and also for proximity measurement. Using the sensor element and the signal conditioning unit, which is connected downstream of the sensor element, the quantity to be measured is converted into an electrical output signal which is proportional, and generally linearly proportional, to the quantity to be measured, for example, a DC voltage signal or a direct current signal. In the analog end stage which is connected downstream of the sensor, for example, to a controllable power source, the output signal of the sensor is converted into an impressed output current which represents the output signal of the electrical transducer. Here the magnitude of the output current represents a measure of the quantity to be measured, for example, a pressure which is to be measured.

The output current is generally fixed within the range from 0 to 20 mA or from 4 to 20 mA, with an output current of 0 or 4 mA representing the starting point and an output current of 20 mA representing the end point of the measurement range. If the electrical transducer is, for example, a pressure transmitter with a measurement range from 0 to 100 bar, at a pressure of 0 bar measured by the sensor the pressure transmitter delivers an output current of 0 or 4 mA, while at a pressure of 100 bar measured by the sensor, the output current of the pressure transmitter is 20 mA. The ratio of the measured pressure to the delivered output current is thus linear, so that an output current of 0 or 4 mA corresponds to zero percent of the measurement range and an output current of 20 mA corresponds to one hundred percent of the measurement range.

The advantage of the output current range from 4 to 20 mA is that an output current of less than 4 mA can be detected by a downstream evaluation unit as an error of the transducer or as a broken wire. Of course, it is also possible to choose a different range for the output current, for example, 5 to 20 mA, but an output current range from 4 to 20 mA has prevailed as the industrial standard.

Since modern electrical transducers are generally made as systems-capable intelligent transducers with which both control, and thus error correction of the measured value, as well as communication with an external control and monitoring unit, these electrical transducers usually have a microprocessor as the processor circuit. These processor circuits can process only digital information so that it is necessary for the electrical transducer or the microprocessor to have at least one analog/digital converter and at least one digital/analog converter. The transmission path of these electrical transducers thus consists of an analog sensor, an analog/digital converter, the microprocessor, a digital/analog converter and analog end stage which makes available the output current which is proportional to the quantity to be measured. In these electrical transducers using the two-wire process, the problem is now that, in the least favorable case, only 4 mA is available as a power supply to all electronic components. It follows that conventional, economical microprocessors can be operated only with a short cycle time in order to achieve the required low power consumption of the microprocessor. But this results in that with one such electrical transducer only relatively slow changes of the quantity to be measured can be detected. If fast changes of the quantity to the measured are to be transmitted without significant adulterations, fast and thus power-intensive microprocessors must be used, then the current of 4 mA which is only available in the least favorable case being insufficient.

German Patent DE 16 40 922 C3 discloses the initially described electrical transducer, in which the attempt was made to resolve the contradiction between the requirements for processing speed on the one hand and the power demand of the circuit components on the other, by the transducer having an analog transmission path and a digital transmission path which is located parallel to the latter, which is supplied with the sensor output signal, and into which the processor circuit is inserted. The analog transmission path is used here as the main transmission path for the sensor output signal, while the correction values computed by the processor circuit after conversion into analog signals are combined with the analog output signal of the sensor. In the known electrical transducer, by dividing the transmission path into an analog transmission path and a digital transmission path parallel to it, the speed of response of the transducer to fast changes of the quantity which is to be measured is increased, but in order to accomplish the required low power consumption of the microprocessor, a low clock frequency and thus low processing speed of the processor circuit are necessary.

SUMMARY OF THE INVENTION

An exemplary object of the invention is to make available an electrical transducer of the initially mentioned type which can be scaled by the user, which has low inherent power consumption and still ensures high response speed, and special low-power, and thus expensive, processor circuits can be abandoned.

This exemplary object is essentially achieved so that the processor circuit in normal operation of the transducer is shifted temporarily into a sleep mode. In the analog measurement signal transmission path an analog scaling unit is inserted such that the output signal of the sensor on the one hand, and at least one analog setting value on the other, are supplied to the analog scaling unit, and that the output signal of the analog scaling unit is supplied to the analog end stage.

It was stated above that the electrical transducer is to be scalable, i.e., that the measurement range will be adjustable by the user. If the electrical transducer is, for example, a pressure transmitter and the pressure transmitter is calibrated at the factory to a measurement range of 0 to 100 bar, this means that at the impressed output current of the electrical transducer of 4 to 20 mA, the pressure transmitter at a measured pressure of 100 bar delivers an output current of 4 mA, and at a measured pressure of 100 bar an output current of 20 mA. If at this point a different measurement range is desired by the user, the user can set this by specifying a new starting point and/or a new end point. If, for example, the measurement range is to extend only from 0 to 50 bar, the output signal of the sensor must be multiplied by a factor, in this example the factor 2, so that at a pressure of 50 bar measured by the sensor the output current delivered by the electrical transducer is 20 mA. This follows from the linear relation between the output current $I_A$ of the transducer and the output signal $U_P$ of the sensor which can be described by the following equation:

$$I_A = f(U_P) = k\, U_P + C$$

k=proportionality factor

C=constant

If not only the end point, but also the starting point of the measurement range are to be changed, and the measurement range is to extend, for example, from 20 to 60 bar, the output signal of the sensor must be multiplied not only by a factor, but the output signal must be reduced first by a constant which is proportional to the set starting point, so that at a pressure of 20 bar measured by the sensor the output current of the transducer is 4 mA. The proportionality factor must then be chosen such that at a pressure of 60 bar measured by the sensor a maximum output current of 20 mA flows.

As was stated initially, the power consumption of a microprocessor is generally greater than the current of 4 mA which is available in the least favorable case. To reduce the power consumption of the processor circuit which generally has a microprocessor, in the electrical transducer of the invention, in normal operation, the processor circuit of the transducer is temporarily shifted into the sleep mode. If the activity time of the processor circuit, i.e., the time during which the processor circuit is not in the sleep mode, but in the awake mode, is much shorter than the time in which the processor circuit remains in the sleep mode, the power consumption of the processor circuit can be limited by the selected measure on the average to a fraction of the nonstop consumption.

Due to the above described measure of shifting the processor circuit in normal operation of the transducer temporarily into the sleep mode, the power consumption of the processor circuit can be reduced to the required value, but this measure leads at the same time to the fact that the analog/digital converter connected upstream of the processor circuit or the downstream digital/analog converter cannot be active when the processor circuit is in the sleep mode. In the initially described transmission path of sensor, analog/digital converter, microprocessor, digital/analog converter, analog end stage, this would lead to the electrical transducer not being able to follow the change in the quantity which is to be measured with the desired response speed.

The electrical transducer is therefore further characterized in that an analog scaling unit is inserted in the analog measurement signal transmission path, to which unit the output signal of the sensor and the at least one analog setting value are supplied. This results in that the output signal of the sensor is routed not only past the processor circuit, specifically via the analog measurement signal transmission path, but scaling of the electrical transducer by the analog scaling unit is possible. Applying an analog adjustment value to the analog scaling unit ensures that the analog adjustment value remains unchanged even during the sleep mode of the processor circuit.

To implement the analog scaling unit, electronic potentiometers can be used even during the sleep mode of the processor circuit since they do not change their resistance setting and thus maintain the set scaling. In these electronic potentiometers however, it is disadvantageous that at the desired accuracy requirement they are very costly and in addition enable only a limited resolution. Therefore, the analog scaling unit is advantageously made as an analog arithmetic circuit to which as the analog setting value, at least one dc voltage signal or direct current signal is delivered.

According to one advantageous embodiment of the invention, there is at least one active integrator as the actuator for at least one dc voltage signal or at least one direct current signal, the integrator being connected to the processor circuit and to the scaling unit. Preferably the active integrator is a component of a control circuit with the processor circuit. Based on the storage property of the integrator, the dc voltage which has been set via the processor circuit or the set direct current is kept constant even during the sleep mode of the processor circuit.

Alternatively, to produce the preferably DC voltage signals via the active integrators, the voltages could also be produced via pulse width modulation, with a static state which does not require computing performance and thus which can be kept even during the sleep mode of the processor circuit by pure timer logic. But in this example, one timer is necessary for each voltage so that the required component cost is relatively high, especially when several DC voltage signals are to be produced.

If the active integrators are a component of the control circuit with the processor circuit, possible deviations of the actual voltages on the integrators from the set voltages can be corrected by the processor circuit during its short activity time. The desired possible low increment when the scaling is set, i.e., high resolution of the scaling unit, can be achieved in that for the processor circuit a microprocessor with external or integrated 10 bit analog/digital converters is used. But conventional microprocessors which have only 8 bit converters can be used, and by using the process described in DE 199 22 060 A1, a higher resolution is then achieved.

In order to implement the proportionality factor necessary when the measurement range is set using an analog arithmetic circuit, at least one analog multiplier is used. One such analog multiplier can be implemented by an analog arithmetic circuit with several transistors and several operational amplifiers. The circuit principle of the multiplier is based on the addition of logarithms according to the following equation:

$$\frac{xy}{z} = \exp[\ln x + \ln y - \ln z]$$

To take the logarithm and raise to the exponent, the current/voltage characteristic of the semiconductor junctions is used, for which the following relationship according to Q. Shockley applies, as is recognized:

$$I = I_S(T)\left(e^{\frac{K_{Diff}}{mU_T}} - 1\right)$$

with:

I=diode current in the conduction direction $I_S$=temperature-dependent blocking current m=correction factor for Shockley diode theory, and $U_T$=voltage equivalent of thermal energy.

Advantageously the analog arithmetic circuit, in addition to the analog multiplier, also has at least one subtractor and/or at least one adder, so that with scaling not only the end point, but in addition the starting point of the measurement range can be changed. How one such analog arithmetic circuit can be built in particular with one multiplier and several subtractors and adders is detailed below in conjunction with the drawings.

It was stated initially that the impressed output current of the electrical transducer is generally 4 to 20 mA. Of course, other values for the impressed output current are also possible. To produce the minimum output current which differs from zero there is preferably one power source.

According to another advantageous embodiment of the electrical transducer, between the scaling unit and the analog end stage an attenuator with a preferably adjustable time constant is connected. Using one such attenuator, very brief fluctuations of the quantity which is to be measured can be suppressed, so that "wobbling" of the output current is prevented. The attenuator can be easily made adjustable by its consisting of different RC elements which can be selectively connected via the processor circuit. If relatively large time constants are to be accomplished with the attenuator, capacitors with a relatively large capacitance value are necessary for this purpose. But with the amount of capacitance of the capacitor the leakage current flowing via the capacitor and the temperature coefficient of the capacitor increase; this leads to an error in the measured value indicated by the impressed output current. Advantageously therefore the attenuator is a component of the control circuit with the processor circuit so that an error at the output of the attenuator is detected by the processor circuit and is compensated using the corresponding correction value.

According to the last advantageous embodiment of the invention which will be briefly mentioned here, on the electrical transducer there is a third input terminal as the third supply terminal which is connected to a detector means so that when a certain power supply voltage is applied to the third input terminal the transducer automatically switches from two-wire operation to three-wire operation. Three-wire operation of the electrical transducer is especially advantageous when the processor circuit is used not only for setting the starting and ending points of the measurement range, i.e., for scaling of the transducer, but when there is to be communication via the processor circuit with an external control and monitoring unit or programming unit. To achieve a sufficient transmission rate, the processor circuit should be permanently in the awake mode in the communications or programming mode of the processor circuit which lasts a longer time. To do this, the detector means is advantageously connected to the processor circuit, by which the latter receives a corresponding information signal when there is a corresponding power supply voltage on the third input terminal so that the processor circuit in three-wire operation of the electrical transducer does not shift into the sleep mode.

In particular, there are a host of possibilities for embodying and developing the electrical transducer as claimed in the invention. To do this reference is made on the one hand to the claims, on the other to the description of embodiments in conjunction with the drawings.

DETAILED DESCRIPTION OF THE INVENTION

Figure 1:
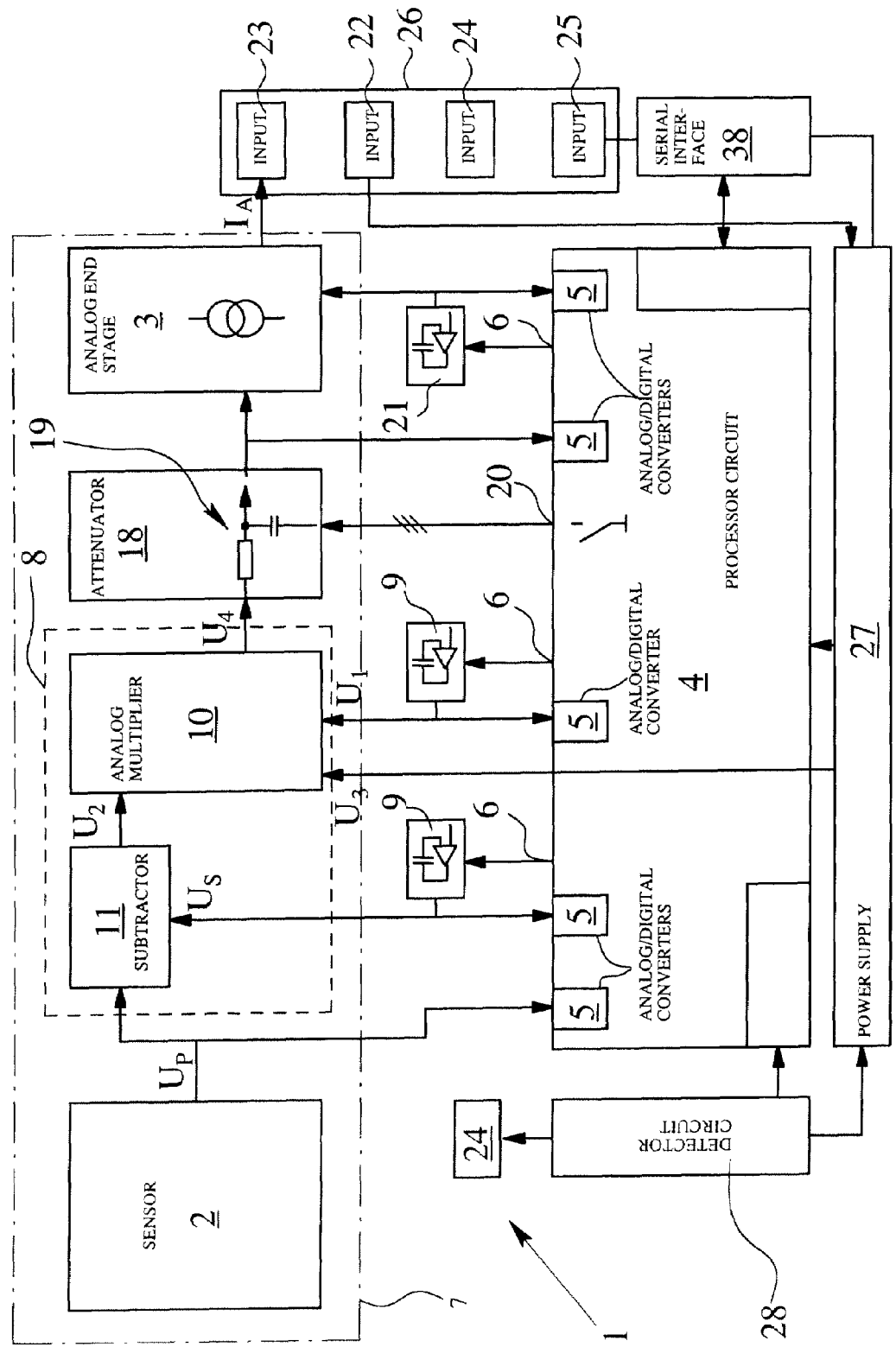
FIG. 1 shows a block diagram of one version of the electrical transducer according to this invention.
Figure 2:
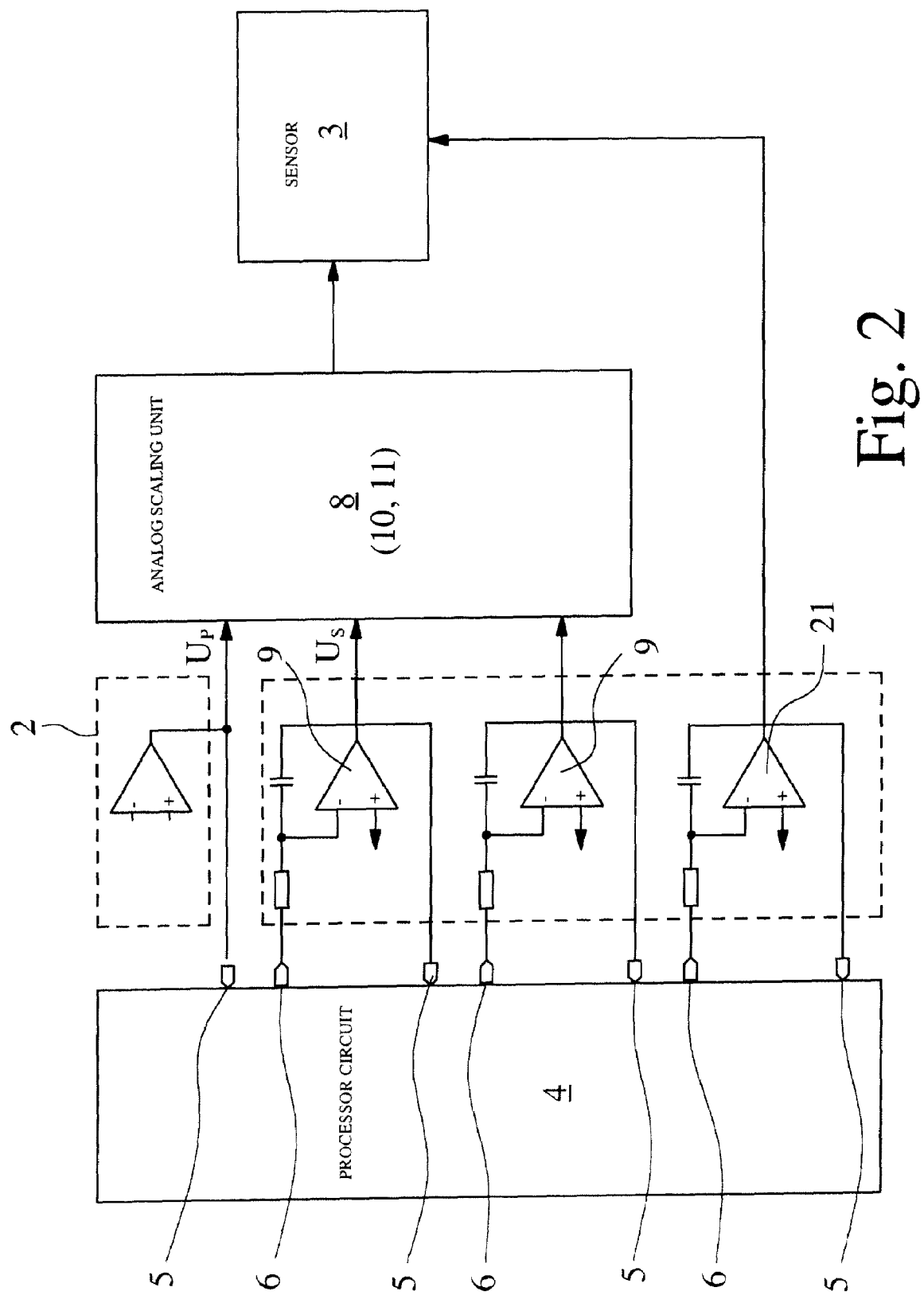
FIG. 2 shows a block diagram of part of one version of the electrical transducer according to this invention.
Figure 7:
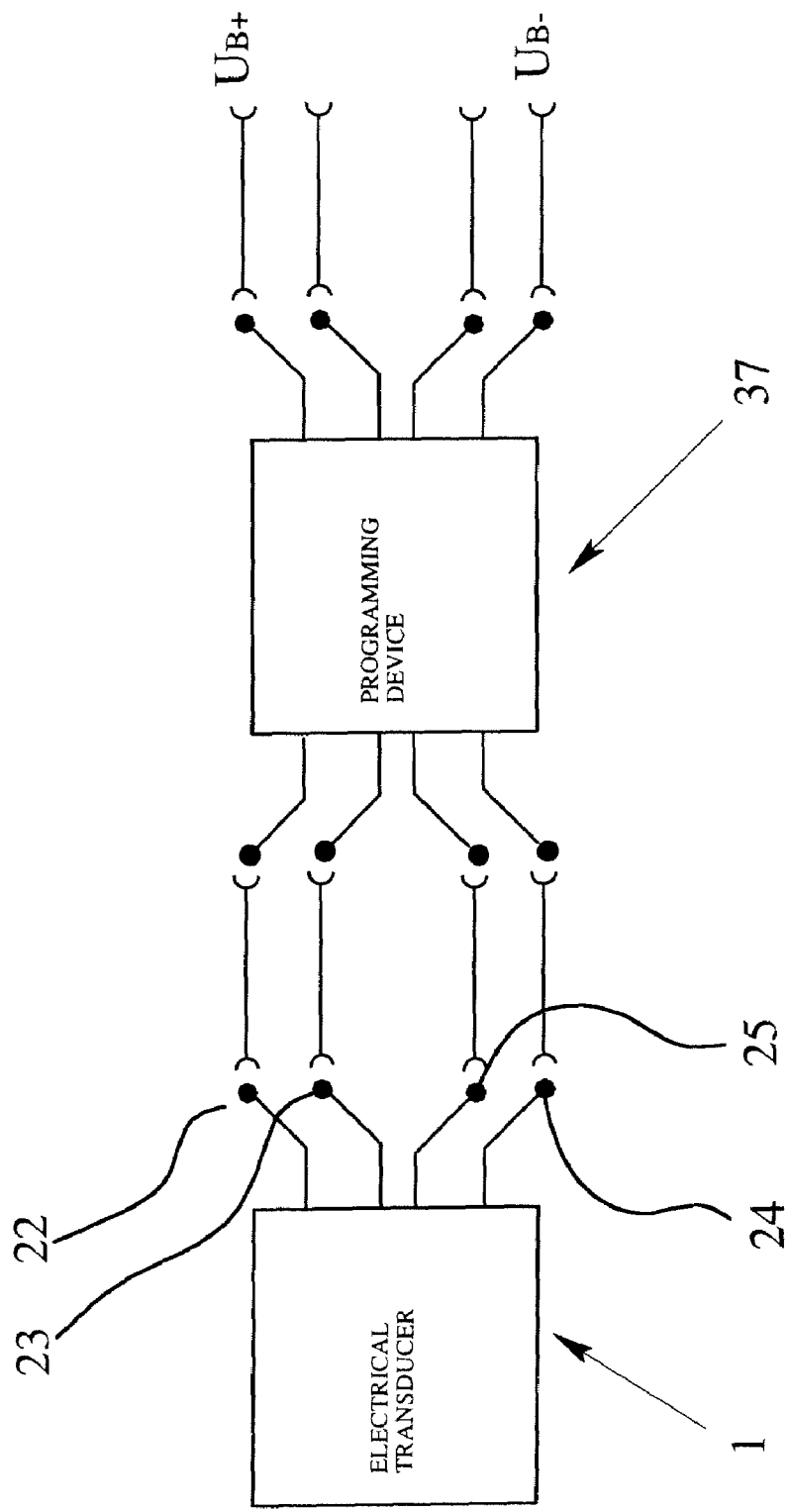
FIG. 7 shows a schematic of the connection of an electrical transducer to a programming unit according to this invention.

FIG. 1 shows a block diagram of one version of an electrical transducer 1 which is shown as a whole only schematically in FIG. 7. The electrical transducer 1 works using the two-wire principle, and has a sensor 2 for acquiring the quantity which is to be measured, and an analog end stage 3 connected downstream of the sensor 2. The sensor 2, besides the actual sensor element which converts the measured quantity into a proportional electrical quantity, has a signal conditioning unit. The signal conditioning unit generally contains a linearizer so that the output signal $U_P$ at the output of the sensor 2 is linearly proportional to the measured quantity, for example, a pressure value. In the analog end stage 3 which can be implemented, for example, by a power source, the output signal lip of the sensor 2 is converted into an impressed output current $I_A$ with a magnitude which is indicative of the quantity which is to be measured.

The electrical transducer 1 has a processor circuit 4 which is used for programming and control of the electrical transducer 1. The processor circuit 4 has several analog/digital converters 5 and several push-pull tristate ports 6. In the electrical transducer 1 the processor circuit 4 is not connected serially between the sensor 2 and the analog end stage 3 so that the electrical transducer 1 has an analog measurement signal transmission path 7. In the analog measurement signal transmission path 7, there is an analog scaling unit 8 to which the output signal $U_P$ of the sensor 2 on the one hand and at least one analog setting value $U_1$, $U_3$ on the other are supplied. The output signal $U_4$ of the analog scaling unit 8 is supplied to the input of the analog end stage 3. The processor circuit 4 in normal operation of the transducer 1 is shifted temporarily into a sleep mode, by which the power consumption of the processor circuit 4 can be limited by the selected measure on the average to a fraction of the nonstop consumption, when the duration of the sleep mode of the processor circuit 4 is much longer than the duration of the awake mode.

Because in the analog measurement signal transmission path 7 there is an analog scaling unit 8 with only analog values at its inputs, transmission of the quantity which is to be measured from the sensor 2 to the analog end stage 3 and the conversion of the output signal $U_P$ of the sensor 2 into an impressed output current $I_A$ can also take place when the processor circuit 4 is in the sleep mode.

The analog setting values which are supplied to the analog scaling unit 8 for scaling of the electrical transducer 1 are made available via active integrators 9. The active integrators 9 on the one hand being connected to the processor circuit 4, and on the other to the analog scaling unit 8. Setting of the DC voltage signals using the active integrators 9 is controlled by the processor circuit 4 with the active integrators 9 connected to its push-pull tristate port 6. The DC voltage signals can be controlled by return of the output signals of the active integrators 9 to the analog/digital converters 5 of the processor circuit 4 so that deviations of the actual DC voltage signals from the set DC voltage signals can be corrected.

The analog scaling unit 8 has an analog multiplier 10 and an analog subtractor 11. Thus it is possible for both the starting point and the end point of the measurement range to be set by the user of the electrical transducer 1. For this purpose, the output signal $U_P$ of the sensor 2 and the starting value $U_S$ are sent to the subtractor 11. The starting value $U_S$ is computed by the processor circuit 4 as a function of the starting point of the measurement range chosen by the user. The difference between the output signal $U_P$ of the sensor 2 and the starting value $U_S$ then forms the remainder value $U_2$ which is sent as the value which is to be multiplied to the input of the multiplier 10. Depending on the chosen starting and end point of the measurement range, a proportionality factor $U_1$ is sent to the second input of the multiplier 10, so that the output signal of the multiplier 10, and thus also of the analog scaling unit 8, is a voltage signal $U_4$ which is sent to the analog end stage 3 which then makes available an output current $I_A$ which corresponds to the measured quantity.

The structure of the analog scaling unit 8, especially of the analog multiplier 10, will be explained below with reference to FIGS. 3 to 5.

Figure 3:
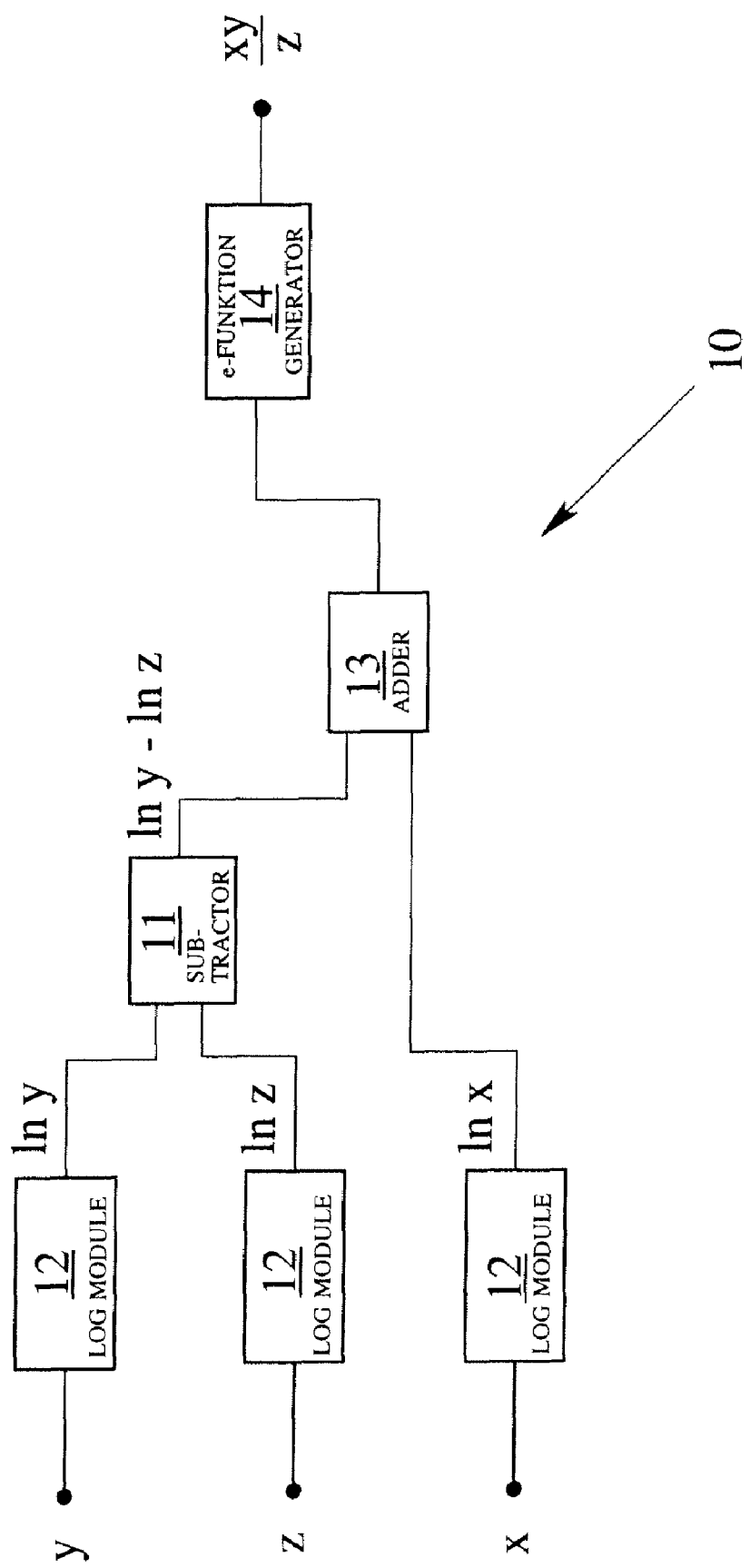
FIG. 3 shows a block diagram of a multiplier based on logarithm addition according to this invention.

FIG. 3 shows a block diagram of a multiplier 10 based on logarithm addition, in which three log modules 12, a subtractor 11, an adder 13 and an e-function generator 14 are used. In the circuitry of the log module 12 shown in FIG. 3, at the output of the e-function generator 14 is the product $$\frac{x \cdot y}{z}.$$

Figure 4A:
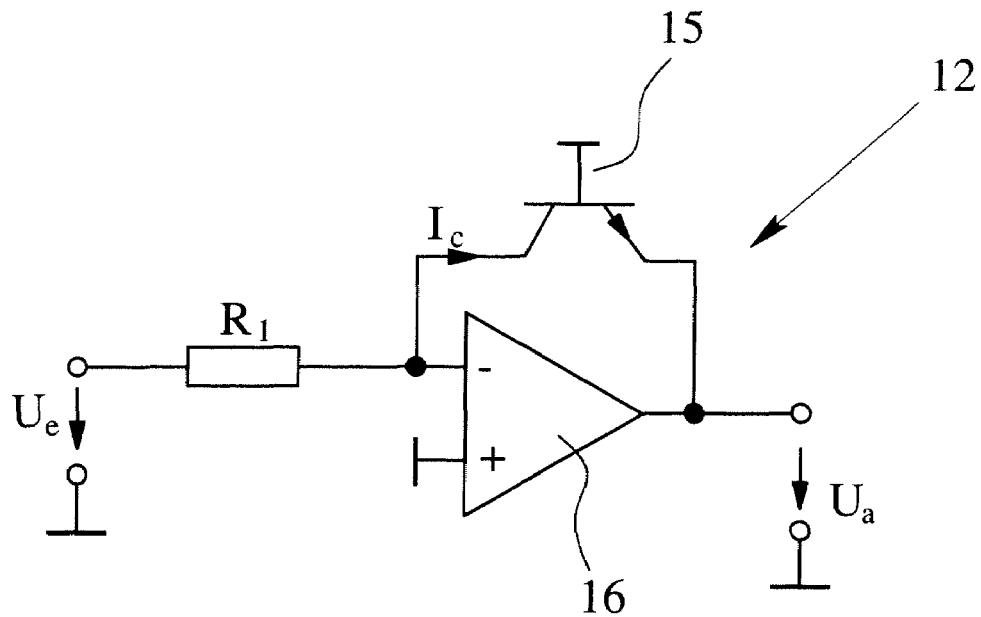
FIG. 4a shows a circuit diagram of a log module with a transistor according to this invention.
Figure 4B:
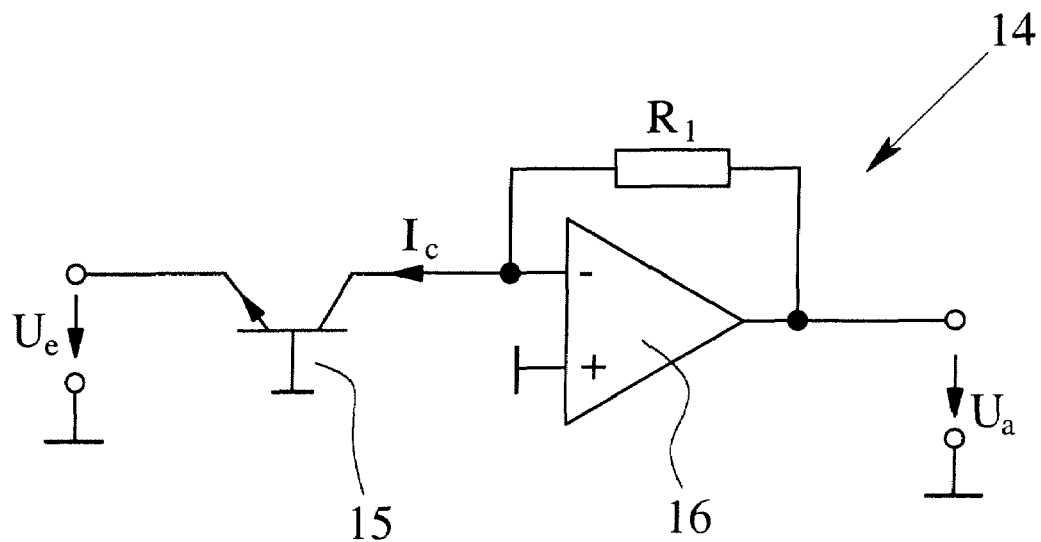
FIG. 4b shows a circuit diagram of an e-function generator with a transistor according to this invention.

FIG. 4a shows a simple circuitry implementation of the log module 12, while FIG. 4b shows a circuit diagram of an e-function generator 14. Both the log module 12 and also the e-function generator 14 are formed each by a transistor 15 and an operational amplifier 16. The following applies to the output voltage $U_a$ of the log module 12:

$$U_a = -U_T \ln \frac{-U_e}{I_{CS} R_l}$$

and the following applies to the output voltage $U_a$ of the e-function generator 14:

$$U_a = I_{CS} \cdot R_l = e^{\frac{-U_e}{U_T}}$$

Figure 5A:
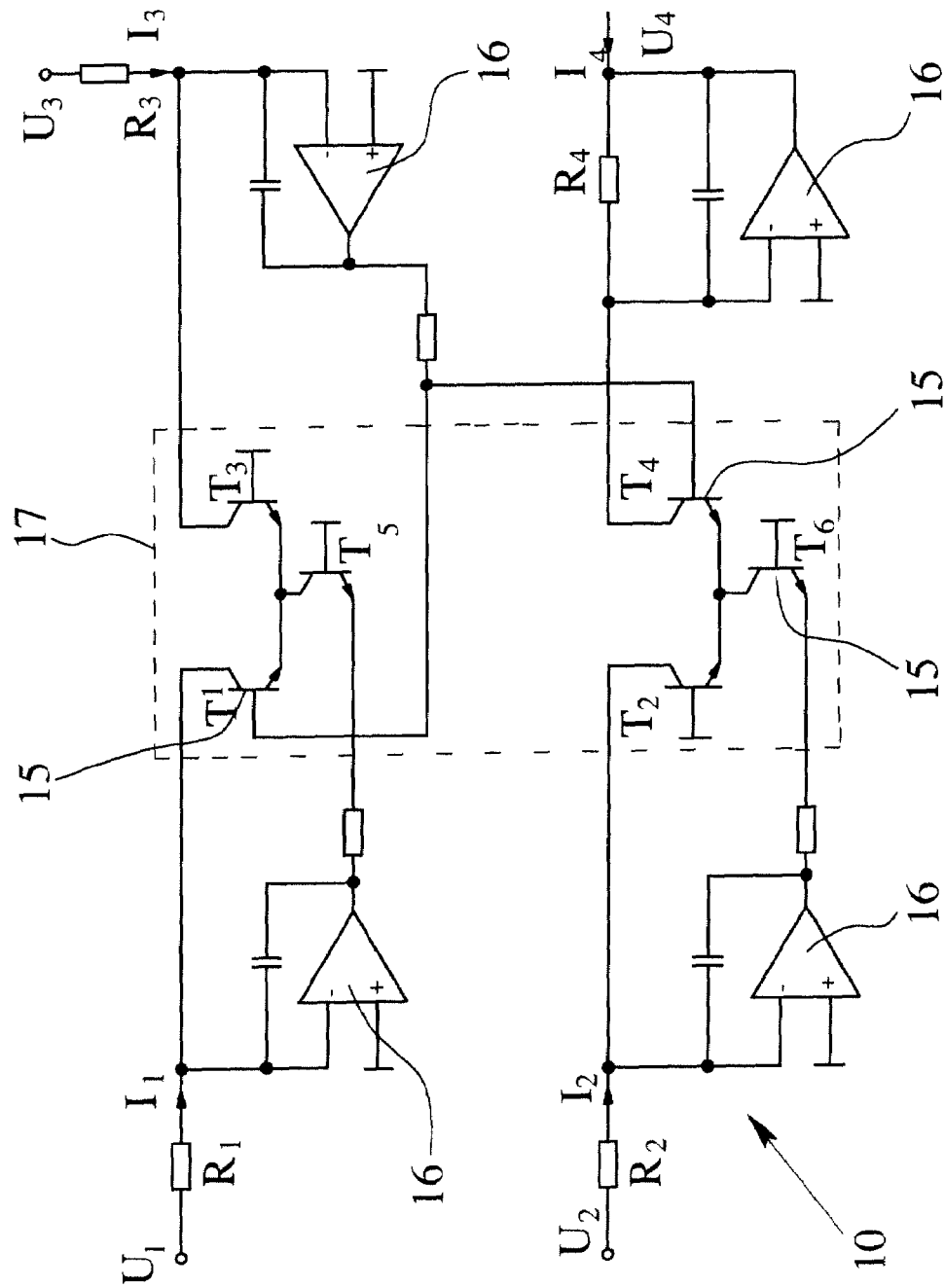
FIG. 5a shows a circuit diagram of a first version of an analog scaling unit of an electrical transducer according to this invention.
Figure 5B:
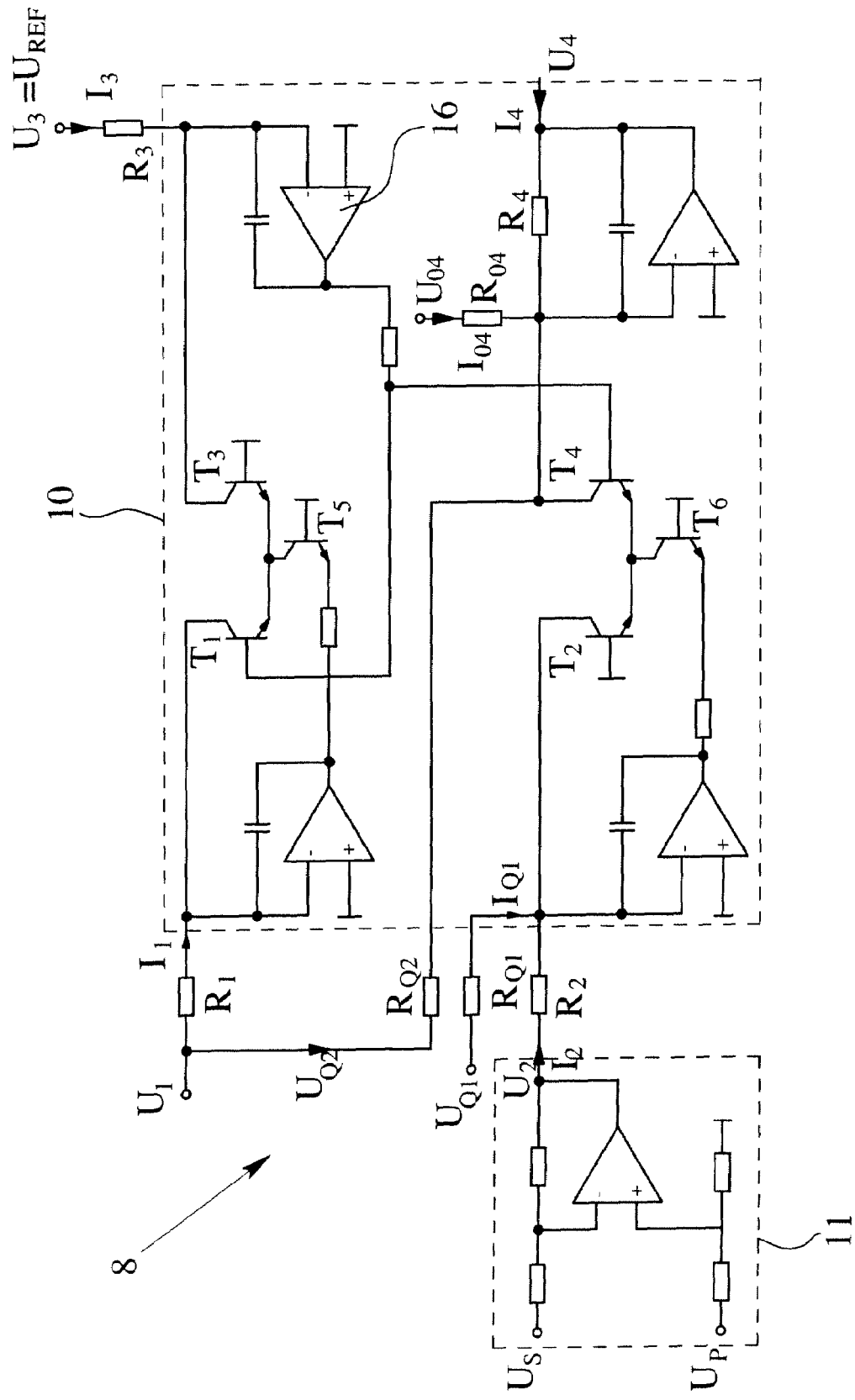
FIG. 5b shows a circuit diagram of a second version of an analog scaling unit of an electrical transducer according to this invention.

FIGS. 5a and 5b each show a diagram of one version of an analog scaling unit 8, especially the multiplier 10 of the electrical transducer 1. The two shown multipliers 10 are each made as a single-quadrant multiplier which is characterized in that all input voltages must be positive and may not become zero. The multipliers 10 each have an even number of transistors 15, by which temperature-induced deviations of the transistors 15 can be better compensated. It is especially advantageous if a monolithic transistor array 17 is used as the multiplier 10, by which the voltage equivalents of thermal energy $U_T$ and the temperature-dependent blocking currents 1 s cancel one another, so that the correction factor m becomes "one". To implement the multiplier 10 only transistors $T_1$ to $T_4$ are necessary, while transistors $T_5$ and $T_6$ are integrated in the transistor array 17 by the manufacturer and are used for difference amplifier applications, but here are used only as current sink access to the coupled emitters. For the multipliers 10 shown in FIGS. 5a and 5b the following applies to the currents $I_1$ to $I_4$ flowing through the transistors $T_1$ to $T_4$:

$$I_4 = \frac{I_1}{I_3} \cdot I_2$$

The magnitude of the current flowing through the multiplier 10, i.e., the current which is required by the multiplier, is determined here among others by the current $I_3$ which is used as the standard to which the other currents $I_1$, $I_2$ and $I_4$ are referenced. The currents $I_1$ to $I_2$ are the factors of the multiplier 10, the current $I_1$ representing the adjustable proportionality factor and the current $I_2$ representing the value to be multiplied, i.e., the value which is proportional to the measured quantity. The current $I_4$ represents the output quantity of the multiplier 10 and thus the product.

While the analog scaling unit 8 shown in FIG. 5a consists simply of one multiplier 10, FIG. 5b shows one preferred development of an analog scaling unit 8, with one multiplier 10 as shown in FIG. 5a and one upstream subtractor 11. On the one hand, the output signal $U_P$ of the sensor 2 and on the other a starting value $U_S$, which is proportional to the chosen initial value of the measurement range, are applied to the input of the subtractor 11. The difference of these two voltage values $U_P$-$U_S$ corresponds to the remaining value $U_2$ which is present at the input of the multiplier 10.

One disadvantage of the single-quadrant multiplier shown in FIG. 5a is that, as has already been stated, multiplication is possible only in the first quadrant, i.e., that all input voltages of the multiplier 10 must be greater than zero. But since, if the starting point of the measurement range is to be adjustable, the remaining value $U_2$ can become negative, specifically when the starting value $U_S$ is greater than the output signal $U_P$ of the sensor 2, a constant offset current $I_{Q1}$ is added to the current $I_2$. This offset current $I_{Q1}$ is made available using a reference voltage $U_{REF}$ and a resistance $R_{Q1}$. This measure expands the definition range of the multiplier 10 a distance into the second quadrant, i.e., a negative input voltage can also be applied to the multiplier 10. But since the offset current $I_{Q1}$, multiplied by the proportionality factor which is set via the voltage $U_1$, is transmitted to the current on the transistor $T_4$, the offset current $I_{Q1}$ leads to a change of the current $I_4$. To prevent one such change of the current $I_4$, and thus an error, an additional correction current $I_{Q2}$ is supplied to the transistor $T_4$. The correction current $I_{Q2}$ is derived from the voltage $U_1$ via the resistor $R_1$. Making available the offset current $I_{Q1}$ and the correction current $I_{Q2}$ in the described manner leads to the two currents $I_{Q1}$, $I_{Q2}$ with respect to the ratio of the input current $I_2$ to the output current $I_4$ completely compensating one another as long as the input current $I_2$ is positive, i.e., as long as the output signal $U_P$ of the sensor 2 is greater than the starting value $U_S$. Compensation takes place independently of the proportionality factor which is set via the voltage $U_1$ so that the offset current $I_{Q1}$ and the correction current $I_{Q2}$ are not involved in the measurement result. If the input current $I_2$ becomes negative, the offset current $I_{Q1}$ is overcompensated by the correction current $I_{Q2}$. This leads to widening of the measurement range of the multiplier 10 into the second quadrant.

To produce a minimum output current $I_A$ different from zero, there is a current source which produces a current $I_{04}$ by a voltage $U_{04}$ and resistance $R_{04}$. Corresponding selection of the voltage $U_{04}$ and of the resistance $R_{04}$ can thus make available an impressed output current $I_A$ with a minimum current $I_{Amin}$ which is, for example, 4 mA as long as the input current $I_2$ is positive. In conjunction with making available the offset current $I_{Q1}$ and the correction current $I_{Q2}$, a minimum output current $I_{Amin}$ less than 4 Ma, for example, 3.6 mA, is possible. By means of the measures described using FIG. 5b, that is, implementation of an offset current $I_{Q1}$, a correction current $IQ_2$ and a current $I_{04}$, it is possible to achieve an unambiguous signal output value 0%=4 mA. The unambiguous signal output value 0%=4 mA is achieved by the lower limit of the measurable range being less than the lower limit of the measurement range, i.e., due to the offset current $I_{Q1}$ a minimum output current $I_{Amin}$ less than 4 mA, for example 3.6 mA, being possible. In this way, the electrical transducer 1 generates an output current $I_A$ of 4 mA which is associated for the user with the statement 0% of the measurement range only when the quantity to be measured in fact corresponds to the selected lower limit of the measurement range. Only at an output current $I_A$ less than, for example, 3.6 mA is there no longer a clear statement. An output current $I_A$ of roughly 3 mA or less is interpreted by a downstream evaluation unit as a cable break or defect of the electrical transducer 1.

The desired low power consumption of the multiplier 10 and thus also of the entire electrical transducer 1 should be overall less than 4 mA, for example, a maximum of 3.6 mA, can be ensured by suitable dimensioning of the individual components of the analog scaling unit 8 which is shown in FIG. 5b. The maximum current depends essentially on the magnitude of the current 13 and the maximum proportionality factor which can be set by the voltage $U_1$. So that the output current $I_4$ does not become too large, the proportionality factor is limited to a value less than 5, this is sufficient for the possibility of scaling the electrical transducer 1 by the user. Some values of the components of the scaling unit 8 which are shown in FIG. 5b are given below by way of example.

If as the reference voltage $U_{REF}=U_3$ a value of 2.5 V is applied, at a resistance $R_3=75$ kΩ a current $I_3$ of 33.3 μA flows. The proportionality factor should be a maximum 4, and for a proportionality factor of 1 the voltage $U_1$ should be 0.5 V. This results in that the resistance $R_1$ must be 15 kΩ. This resistance value is also chosen for the resistors $R_2$ and $R_4$. At this maximum voltage $U_{2max}=2$ V, thus the maximum current $I_{2max}=133.3$ μA arises.

For the offset current $IQ_2$, a magnitude of 1% of the maximum current $I_{2max}$ is chosen so that the required offset current $IQ_2$ at a voltage $U_{Q1}=U_{REF}=2.5$ V can be set by a resistance $R_{Q1}=1.875$MΩ. The correction current $IQ_2$ necessary at the time and thus the necessary resistance $RQ_2$ can be computed from the chosen value for the offset current $IQ_1$ as a function of the proportionality factor determined by the voltage $U_1$. At a proportionality factor of 1, which corresponds to $U_1=0.5$ V, the correction current $IQ_2$ must correspond to the offset current $I_{Q1}$, This yields a resistance $R_{Q2}=375$ kΩ. At the selected values for the individual components of the analog scaling unit 8 shown in FIG. 5b, for the maximum output current $I_4$ of the analog multiplier 10 there follows:

$$I_{4max} = I_{2max} \cdot \frac{I_{1max}}{I_3} = I_{2max} \cdot 4 = 533.3 \text{ μA}$$

It can be seen from the block diagram of the electrical transducer 1, illustrated in FIG. 1, that an attenuator 18 is connected downstream of the analog scaling unit 8. This attenuator 18 has an adjustable time constant which is implemented by the attenuator 18 having several RC elements 19. The desired time constant of the attenuator 18 can be set by the output 20 of the processor circuit 4 being selectively connected to one of the RC elements 19. To do this, the output 20 of the processor circuit 4 is selectively connected to the base point of a capacitor of the RC element 19.

The output of the attenuator 18 is connected on the one hand to the analog end stage 3, and on the other to the analog/digital converter 5 of the processor circuit 4 so that the error caused by the attenuator 18 can be compensated via the control circuit with the processor circuit 4. To do this, the processor circuit 4 is connected via another analog/digital converter 5 to the output signal $U_P$ of the sensor 2. Using the available output signal $U_P$ and using the set parameters, the processor circuit 4 can thus compute the value which would have to be present at the output of the attenuator 18. The processor circuit 4 compares this computed value to the actual output value and compensates for possible errors via an end stage offset integrator 21 which is connected to the analog end stage 3.

Figure 6A:
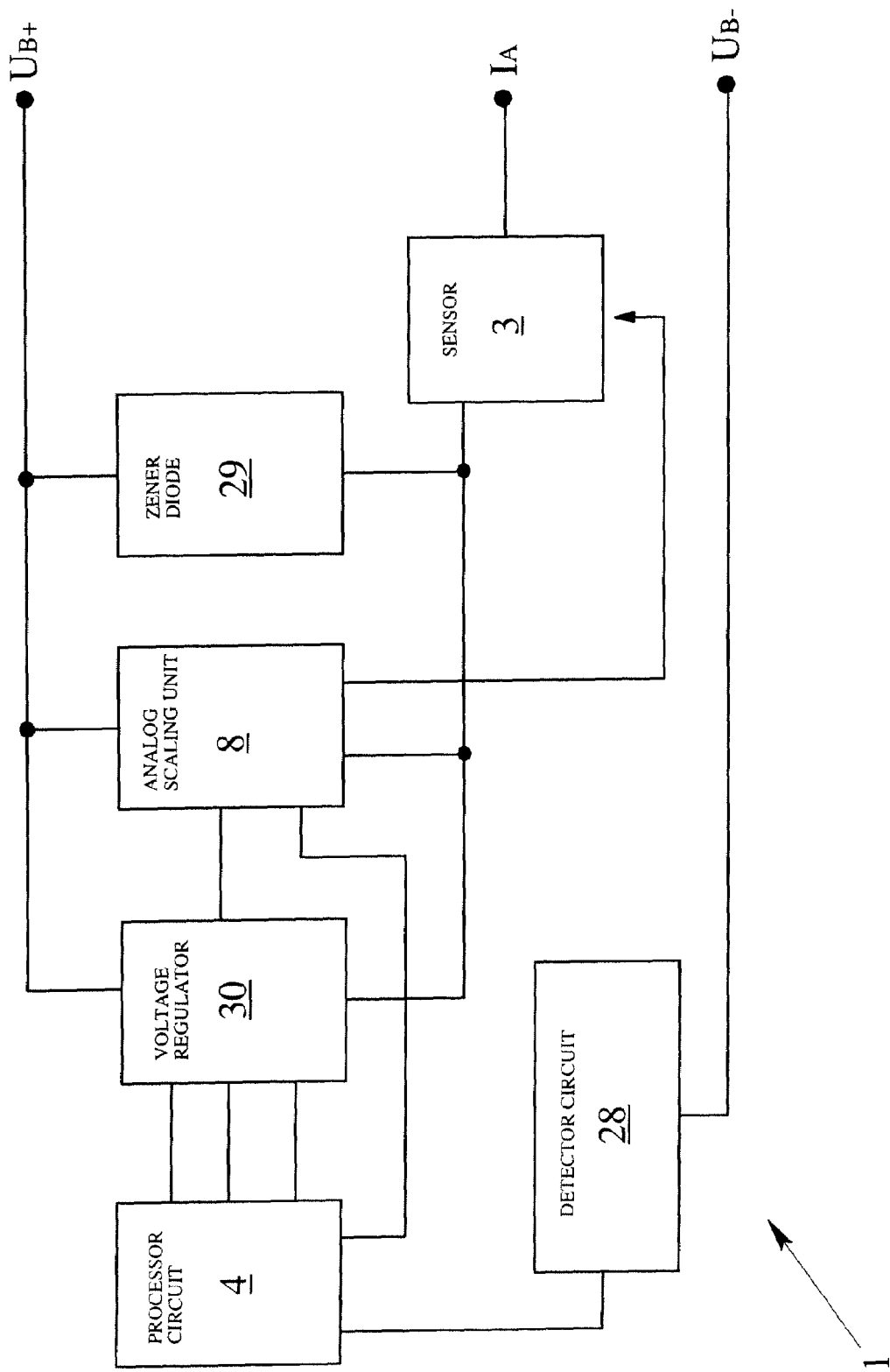
FIG. 6a shows a block diagram of the supply principle of an electrical transducer according to this invention.
Figure 6B:
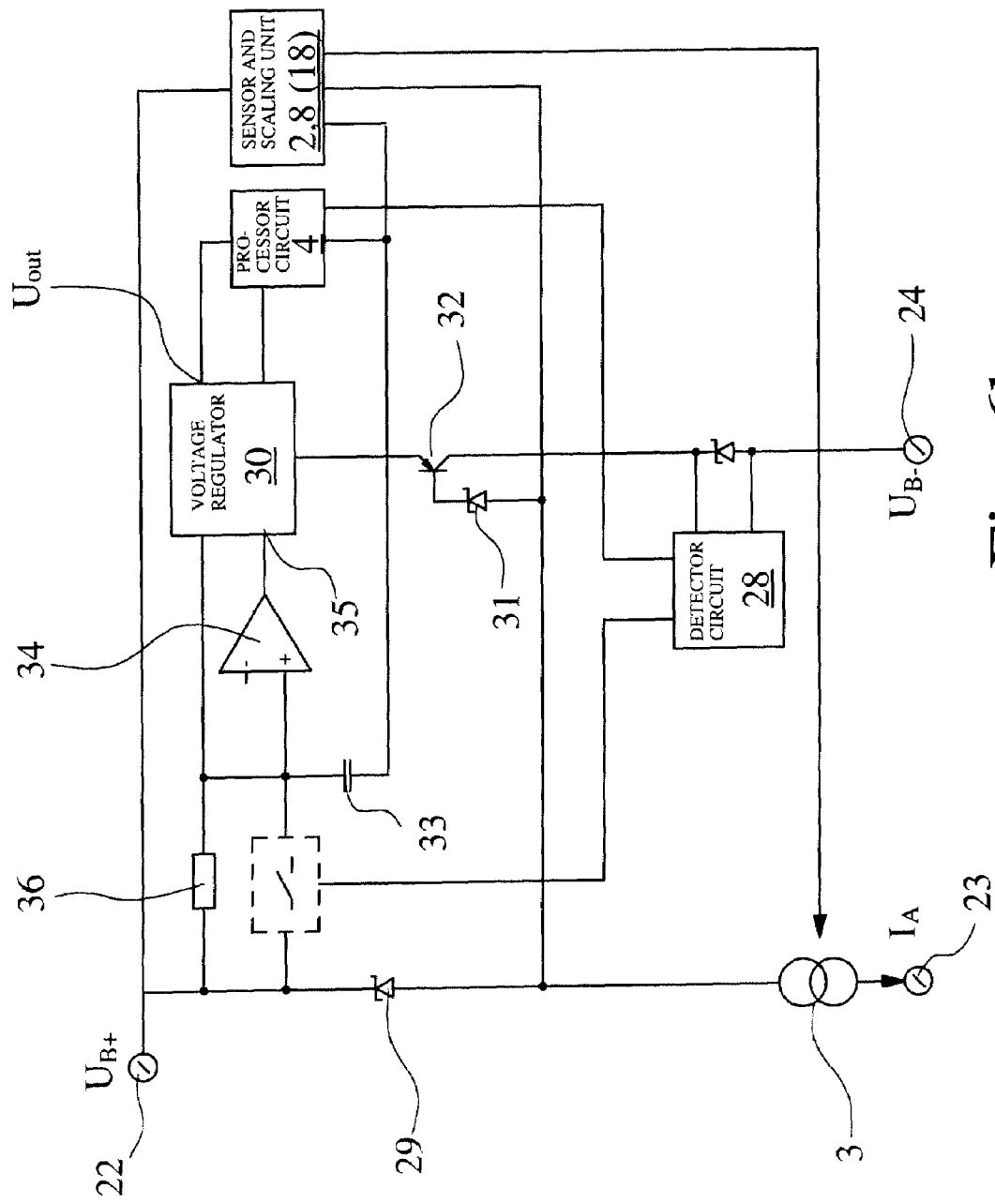
FIG. 6b shows a circuit diagram of the supply principle of an electrical transducer according to this invention.

FIGS. 6a and 6b show a block diagram and a circuit diagram of the supply principle of the electric transducer 1. In two-wire operation of the electrical transducer 1, only the two input terminals 22 and 23 are connected, the positive supply voltage $U_{B+}$ being present at the first input terminal 22. The second input terminal 23 is connected to the output of the analog end stage 3 so that the impressed output current $1_A$ from the first input terminal 22 flows via the electrical transducer 1 to the second input terminal 23. In addition, the electrical transducer 1 has a third input terminal 24, at which the negative supply voltage $U_{B-}$ is present, and a fourth input terminal 25. All four input terminals 22 to 25 are combined in a plug connector 26 which is connected to the power supply 27 of the electrical transducer 1.

If a negative voltage $U_{P-}$ of a certain magnitude is connected to the third input terminal 24, the electrical transducer 1 automatically switches from two-line operation to three-line operation. To do this, the electrical transducer 1 has a detector circuit 28 which detects the flow of current via the third input terminal 24. If the third input terminal 24 is connected to the negative operating voltage $U_{B-}$, this is ascertained by the detector circuit 28, whereupon the detector circuit 28 delivers a signal to the input of the processor circuit 4, by which the processor circuit 4 remains permanently in the awake mode. The increased current which is required by the processor circuit 4 in the awake mode is made available via the first input terminal 22 and the third input terminal 24, while the impressed output current $I_A$ flows via the second input terminal 23.

In two-wire operation of the electrical transducer 1, the main current path between the first input terminal 22 and the second input terminal 23 consists of a series connection of a Zener diode 29 and the analog end stage 3. The analog end stage 3 shown in FIG. 6b as the power source regulates the output current $I_A$ to a value of 4 to 20 mA. All the electronics are connected in parallel to the Zener diode 29, i.e., both the analog scaling unit 8 and also the processor circuit 4 are supplied with internal operating voltage by the voltage drop on the Zener diode 29. While the analog scaling unit 8 is directly connected to the anode and the cathode of the Zener diode 29, the processor circuit 4 is connected via its own circuitry to the Zener diode 29. This circuitry has a voltage regulator 30 which is connected to the anode of the Zener diode 29 via a band-gap diode 31 and the base-emitter segment of a pnp transistor 32. The circuitry of the processor circuit 4 moreover has another storage capacitor 33 and a voltage comparator 34.

In two-wire operation of the electrical transducer 1, the main current path between the first input terminal 22 and the second input terminal 23 consists of a series connection of a Zener diode 29 and the analog end stage 3. The analog end stage 3 shown in Figure 6b as the power source regulates the output current $I_A$ to a value of 4 to 20 mA. All the electronics are connected in parallel to the Zener diode 29, i.e., both the analog scaling unit 8 and also the processor circuit 4 are supplied with internal operating voltage by the voltage drop on the Zener diode 29. While the analog scaling Unit 8 is directly connected to the anode and the cathode of the Zener diode 29. the processor circuit 4 is connected via its own circuitry to the Zener diode 29. This circuitry has a voltage regulator 30 which is connected to the anode of the Zener diode 29 via a hand-gap diode 31 and the base-emitter segment of a pnp transistor 32. The circuitry of the processor Circuit 4 moreover has another storage capacitor 33 and a voltage comparator 34

In two-wire operation of the electrical transducer 1, the power required by the processor circuit 4 in the awake mode is made available by charging the storage capacitor 33 which has generous dimensions. The voltage comparator 34 monitors the charging state of the storage capacitor 33 and when it falls below the necessary bias, forces the downstream voltage regulator 30 to set its output voltage $U_{out}$ to zero via its shut-down input 35 and thus to cut off the current in the circuitry of the processor circuit 4. The voltage regulator 30 is only isolated again when the charging voltage of the storage capacitor 33 rises above the bias set by the voltage comparator and thus makes ready enough current for the following active phase, i.e., following the awake mode, to the processor circuit 4.

In three-wire operation of the electrical transducer 1, the current flowing from the input terminal 22 is divided into the impressed output current $I_A$ which flows via the input terminal 23, and the increased operating current which flows via the third input terminal 24. If the third input terminal 24 is connected to the negative voltage $U_{B-}$, the detector means 28 bridges the series resistor 36 upstream of the storage capacitor 33 in order to prevent an overly large voltage drop on the series resistor 36 in continuous operation of the processor circuit 4 as a result of the increased operating current which has then been made available.

FIG. 7 shows a schematic of the connection of an electrical transducer 1 to a programming device 37 A display device can also be integrated into the programming device 37 so that not only data can be input via the programming device 37 into the electrical transducer 1, but subsequently data from the electrical transducer 1 can be read out and displayed on the programming device 37. Exchange of data takes place between the programming device 37 and the electrical transducer 1 via the fourth input terminal 25 of the electrical transducer 1 and the corresponding output terminal of the programming device 37.

The fourth input terminal 25 is connected for this purpose via a serial interface 38 to the processor circuit 4. So that the processor circuit 4 of the electrical transducer 1 can remain permanently in the awake mode during the programming and scaling process, the required operating voltage is made available via the programming device 37 on the first input terminal 22 and on the third input terminal 24 of the electrical transducer 1.

It is, therefore, apparent that there has been provided, in accordance with the present invention, an electronic transducer using a 2 wire process. While this invention has been described in conjunction with a number of embodiments, it is evident that many alternatives, modifications, and variations would be or are apparent to those of ordinary skill in the applicable arts. Accordingly, the disclosure is intended to embrace all such alternatives, modifications, equivalents and variations that are within the spirit and scope of this invention.

What is claimed is:

1. An electrical transducer using a two-wire process comprising:
an analog sensor that detects a quantity to be measured;
an analog end stage which is connected downstream of the sensor at the output end of the transducer;
a processor circuit; and
wherein the processor circuit is not connected serially between the sensor and the analog end stage so that a separate analog measurement signal transmission path is realized, the analog end stage converting an output signal of the sensor into an impressed output current with a magnitude which is a measure of the quantity to be measured and is fixed within a range of about 0 to 20 mA, the electrical transducer being controlled by the processor circuit, wherein during normal operation of the electrical transducer, the processor circuit is shifted temporarily from an awake mode into a sleep mode in which the processor circuit is inactive, the analog measurement signal transmission path including an analog scaling unit, the output signal of the sensor and at least one analog setting value are supplied to the analog scaling unit, and the output signal of the analog scaling unit is supplied to the analog end stage; wherein the output signal of the sensor is routed past the processor circuit via the analog signal transmission path when the processor is in said sleep mode for enabling changes in the quantity being measured to be followed while the processor circuit is inactive;
wherein the processor circuit has an activity time in which the processor circuit is active which is shorter than the time that the processor circuit remains in the sleep mode; wherein the analog scaling unit comprises an analog arithmetic circuit; wherein said at least one analog setting value is a DC voltage signal or a direct current signal which is delivered to the analog arithmetic circuit of the analog scaling unit; and wherein at least one active integrator is connected to the processor circuit and to the analog scaling unit as an actuator for producing said DC voltage signal or direct current signal.

2. The electrical transducer of claim 1, wherein the at least one active integrator is a component of a control circuit within the processor circuit.

3. The electrical transducer of claim 1, wherein the analog arithmetic circuit comprises at least one analog multiplier.

4. The electrical transducer of claim 3, wherein the at least one analog multiplier is a single quadrant multiplier.

5. The electrical transducer of claim 4, wherein an adder is connected to the input of the single quadrant multiplier, and a subtractor and an adder are connected to the output of the single quadrant multiplier.

6. The electrical transducer of claim 3, wherein the analog arithmetic circuit further comprises at least one subtractor and at least one adder.

7. The electrical transducer of claim 3, wherein the analog arithmetic circuit comprises a plurality of transistors and a plurality of operational amplifiers.

8. The electrical transducer of claim 1, further comprising a power source that produces a non-zero output current.

9. The electrical transducer of claim 1, further comprising an attenuator, having an adjustable time constant, connected between the analog scaling unit and the analog end stage.

10. The electrical transducer of claim 9, wherein the attenuator comprises a plurality of different RC elements which are selectively connectable via the processor circuit.

11. The electrical transducer of claim 9, wherein an analog error at the output of the attenuator is compensated by a control circuit.

12. The electrical transducer of claim 1, further comprising three power supply terminals, one of which is connected to a detector means so that when a predetermined power supply voltage is applied supply terminals, the transducer automatically switches to three-wire operation.

13. The electrical transducer of claim 12, wherein the detector means is connected to the processor circuit, and the processor circuit shifts permanently into the awake mode during three-wire operation.

14. The electrical transducer of claim 1 wherein the at least one active integrator is an actuator for said at least one direct current signal.

15. The electrical transducer of claim 1, wherein the impressed output current is fixed within a range of about 4 to 20 mA.

16. A method of producing an indication of a measured value with an electrical transducer via an output current which is proportional to the measured value, the transducer comprising a sensor, an analog end stage which is connected downstream of the sensor at the output end of the transducer, an electronic circuit which is connected downstream of the sensor, and a processor circuit which is not connected serially between the sensor and the analog end stage so that an analog measurement signal transmission path is realized, the electronic circuit converting an output signal of the sensor into an impressed output current with a level corresponding to the measured value and is fixed within a range of about 0 to 20 mA, the electrical transducer being programmed using the processor circuit, wherein during normal operation of the transducer, the processor circuit is shifted temporarily from an awake mode into a sleep mode in which the processor is inactive, the output signal of the sensor is supplied to an analog scaling unit, at least one analog setting value is supplied to the analog scaling unit, and the output signal of the analog scaling unit is supplied to the electronic circuit;

wherein the output signal of the sensor is routed past the processor circuit via the analog signal transmission path when the processor is in said sleep mode for enabling changes in the quantity being measured to be followed while the processor circuit is inactive;

wherein the processor circuit has an activity time in which the processor circuit is active which is shorter than the time that the processor circuit remains in the sleep mode;

wherein the analog scaling unit comprises an analog arithmetic circuit;

wherein said at least one analog setting value is a DC voltage signal or a direct current signal which is delivered to the analog arithmetic circuit of the analog scaling unit; and wherein at least one active integrator is connected to the processor circuit and to the analog scaling unit as an actuator for producing said DC voltage signal or direct current signal.

17. The method of claim 16, wherein the impressed output current is fixed within a range of about 4 to 20 mA.

* * * * *